United States Patent Office 3,065,176
Patented Nov. 20, 1962

3,065,176
PREPARATION OF SUSPENSIONS OF WATER-SOLUBLE SOLIDS IN OLEAGINOUS MEDIA
Edward John Blake and Walter Morrison, Sunbury-on-Thames, England, assignors to The British Petroleum Company Limited, London, England, a joint-stock corporation of Great Britain
No Drawing. Filed Oct. 26, 1959, Ser. No. 848,539
Claims priority, application Great Britain Oct. 31, 1958
20 Claims. (Cl. 252—18)

This invention relates to the preparation of suspensions of water-soluble solids in oleaginous media, such as hydrocarbons, in which the solids are insoluble.

It is often desired to incorporate water-soluble, oil-insoluble solids in oleaginous media, such as mineral lubricating oils and greases. For example, sodium nitrite at about 2% weight concentration is now frequently used as a corrosion inhibitor in lubricating grease. To be effective as a corrosion inhibitor and to eliminate any abrasive tendencies, the crystals of the sodium nitrite must be stably dispersed and of very small particle size, preferably less than 5 microns. The same considerations also often apply to dispersions of other water-soluble solids in other oleaginous media.

One method of obtaining a stable suspension of finely divided particles is to use large amounts of petroleum sulphonates as dispersing agents but it has been stated that the compositions produced are very sensitive to the presence of water and, in the case of greases, tend to lose their structure.

Another method which has recently been proposed for this purpose is to emulsify an aqueous solution of the solid with an oleaginous liquid to form a water-in-oil emulsion using an emulsifying agent capable of forming such an emulsion, and thereafter heating the emulsion to drive off the water. However, when using the emulsifying agents suggested for this technique, e.g. sodium stearate, sodium hydroxy-stearate, basic calcium alkyl sulphonates and sodium alkyl sulphonate, poor dispersions with large individual crystal sizes were obtained.

We have now found that improved suspensions can be obtained by using a particular material as an emulsifying and dispersing agent.

According to the invention, there is provided a method of preparing a suspension of particles of a water-soluble solid in an oleaginous medium, in which an aqueous solution of the solid is emulsified with an oleaginous liquid to form a water-in-oil emulsion using an autocondensation product of 12-hydroxystearic acid as an emulsifying agent, and the emulsion is thereafter dehydrated.

The autocondensation product may be prepared by heating 12-hydroxystearic acid e.g. to a temperature in the range of 150° to 250° C. The autocondensation product used in the present invention should preferably be one having an acid value (as measured by IP 139/57) not greater than 100 mg. KOH/g., especially not greater than 50 mg. KOH/g. Its saponification value (as measured by IP 136/58) should preferably be at least 50, especially at least 100, units greater than its acid value.

In carrying out the method of the invention, the autocondensation product may conveniently be dissolved in the oleaginous liquid and the aqueous solution thereafter added. The emulsion may be produced by agitation of the mixture, e.g. by stirring, milling or both. Dehydration of the emulsion may be most conveniently effected by heating, e.g. at a temperature of 115°–170° C. During dehydration by heating it is advisable to continue stirring the emulsion to reduce foaming and to ensure that the emulsion does not break.

The oleaginous liquid may be a mineral oil, e.g. a lubricating oil, a residue, a fuel oil or kerosine. It may also be a vegetable oil, e.g. castor oil, or a synthetic oil, e.g. a diester, a polyglycol, a polyether or a silicon-containing synthetic oil. In order to produce a lubricating grease containing a dispersion of a water-soluble solid, a dispersion of the solid in a lubricating oil prepared as described above, may be either mixed with a grease or thickened to a grease consistency in known manner with a grease-forming agent.

Preferably the concentration of water-soluble solid in the final composition is 0.5–25% by weight.

Preferably the amount of autocondensation product used is 0.1–10%, especially 0.5–7.5%, by weight on the oleaginous liquid.

In general it is desirable to use a fairly concentrated solution of the water-soluble solid as this reduces the amount of water which has to be removed from the emulsion. Solutions having a solids concentration of 20–70% wt. are particularly satisfactory.

Water soluble solids which can be suspended in oleaginous media by the method according to the invention include water-soluble corrosion inhibitors such as alkali metal and ammonium nitrites, carbonates, bicarbonates, sulphites, borates, chlorates, perchlorates, hypochlorites, silicates, phosphates, salicylates, citrates, tannates, lactates, tartrates, oxalates, phthalates, acetates, iodates, arsenites, chromates, molybdates and tungstates, and amine nitrites, phosphates and iodates. However, the invention is not limited to the use of water-soluble solids that are corrosion inhibitors. Examples of other water-soluble solids that may be used include water-soluble extreme pressure agents such as hydroxy fatty acids, polycarboxylic acids, hydroxy polycarboxylic acids, organic salts (e.g. sodium benzoate), amides and amino acids.

An example of the invention will now be described. The autocondensation product used in the example was obtained by heating 12-hydroxystearic acid for 12 hours at 180° C. The product was a viscous amber liquid having an acid value of 41 mg. KOH/g. and a saponification value of 168 mg. KOH/g. (The 12-hydroxystearic acid used had an acid value of 173 mg. KOH/g. and a saponification value of 185 mg. KOH/g.)

*Example*

Two and a half grams of the autocondensation product were dissolved in 100 grams of 150/75 grade lubricating oil (Redwood I viscosity at 140° F.: 150 seconds; viscosity index: 75) by warming and gentle stirring. Fifteen grams of sodium nitrite crystals were dissolved in 30 grams of distilled water and this solution was emulsified with the oil solution using a laboratory mixer operating at 3000 revolutions per minute. The water-in-oil emulsion so formed was then heated to 140° C. to drive off the water while high speed stirring was continued. (Heating to 140° C. took approximately 15 minutes and the dispersion was held at slightly over 140° C. for 1–2 minutes.) The mix was then allowed to cool to atmospheric temperature with gentle stirring.

On examining the anhydrous dispersion of sodium nitrite crystals in oil so formed, under the microscope using polarised light, it was found that a fine even dispersion of sodium nitrite crystals had been obtained, no individual crystal size being greater than 5 microns.

The above example was repeated using, in turn, potassium chromate, sodium benzoate and sodium tungstate in place of sodium nitrite. Again, fine even dispersions were obtained, no crystal size being greater than 5 microns.

The use of autocondensed 12-hydroxystearic acid in producing the dispersions according to the invention has the following advantages:

(a) It is readily prepared from 12-hydroxystearic acid which is commercially available and relatively cheap.

(b) It is not necessary to use evaporation on heated drums or recirculation through fine nozzles during the dehydration step as mentioned in previous proposals for producing dispersions by the emulsification technique.

We claim:

1. A method of preparing a suspension of particles of a water-soluble solid in an oleaginous medium which comprises emulsifying an aqueous solution of the solid with an oleaginous liquid and an autocondensation product of 12-hydroxystearic acid to form a water-in-oil emulsion, and thereafter dehydrating the emulsion.

2. A method according to claim 1, in which the autocondensation product has been prepared by heating 12-hydroxystearic acid.

3. A method according to claim 2, in which the heating was carried out at 150–250° C.

4. A method according to claim 1, in which the autocondensation product used is one having an acid value not greater than 100 mg. KOH/g.

5. A method according to claim 4, in which the autocondensation product used has an acid value not greater than 50 mg. KOH/g.

6. A method according to claim 1, in which the autocondensation product used has a saponification value of at least 50 units greater than its acid value.

7. A method according to claim 6, in which the autocondensation product used has a saponification value at least 100 units greater than its acid value.

8. A method according to claim 1, in which the autocondensation product is dissolved in the oleaginous liquid and the aqueous solution thereafter added.

9. A method according to claim 1, in which the emulsion is produced by agitating the oleaginous and aqueous phases.

10. A method according to claim 1, in which the dehydration of the emulsion is effected by heating.

11. A method according to claim 10, in which the heating is carried out at a temperature of 115–170° C.

12. A method according to claim 1, in which the oleaginous liquid is a lubricating oil.

13. A method according to claim 12, in which the lubricating oil is a mineral lubricating oil.

14. A method according to claim 1, in which the amount of autocondensation product used is 0.1–10% by weight of the oleaginous liquid.

15. A method according to claim 14, in which the amount of autocondensation product used is 0.5–7.5% by weight of the oleaginous liquid.

16. A method according to claim 1, in which the aqueous solution has a solids concentration of 20–70% by weight.

17. A method according to claim 1, in which the concentration of water-soluble solid suspended in the final composition is 0.5–25% by weight.

18. A method according to claim 1, in which the water-soluble solid is sodium nitrite.

19. In a method of producing a lubricating grease containing a suspension of particles of a water-soluble solid, the improvement which comprises preparing a suspension of particles of the water-soluble solid in a lubricating oil in a manner as specified in claim 12, and mixing the resulting suspension with a grease.

20. In a method of producing a lubricating grease containing a suspension of particles of a water-soluble solid, the improvement which comprises preparing a suspension of particles of the water-soluble solid in a lubricating oil in a manner as specified in claim 12, and thickening the resulting suspension to a grease consistency with a grease-forming agent.

References Cited in the file of this patent

UNITED STATES PATENTS

| | | |
|---|---|---|
| 2,342,199 | Hurtt | Feb. 22, 1944 |
| 2,403,928 | Kleinholtz | July 16, 1946 |
| 2,628,938 | Whitney | Feb. 17, 1953 |
| 2,695,878 | Entwistle | Nov. 30, 1954 |
| 2,822,331 | Dilworth et al. | Feb. 4, 1958 |

FOREIGN PATENTS

| | | |
|---|---|---|
| 778,822 | Great Britain | July 10, 1957 |